(No Model.)
J. F. MANAHAN.
LADDER HOOK.
No. 297,822. Patented Apr. 29, 1884.
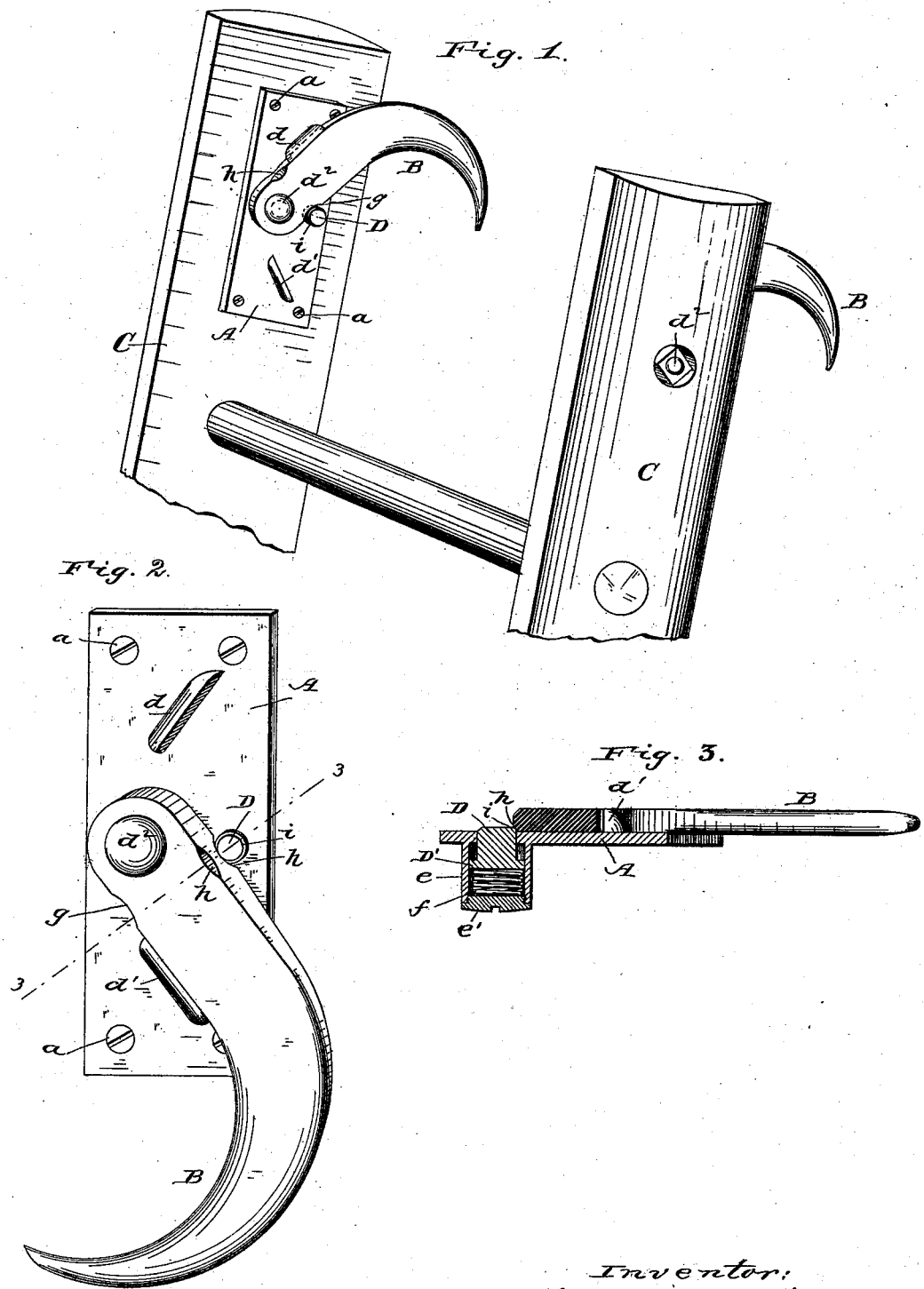
Witnesses:
Evella Dick
J. Walter Blandford
Inventor:
John F. Manahan
by Maneller Bailey
his attorney

UNITED STATES PATENT OFFICE

JOHN F. MANAHAN, OF LOWELL, MASSACHUSETTS.

LADDER-HOOK.

SPECIFICATION forming part of Letters Patent No. 297,822, dated April 29, 1884.

Application filed March 28, 1884. (No model.)

*To all whom it may concern:*

Be it known that I, JOHN F. MANAHAN, of Lowell, in the State of Massachusetts, have invented certain new and useful Improvements in Ladder-Hooks, of which the following is a specification.

In Letters Patent No. 285,637, dated September 25, 1883, I have described a ladder-hook in which the hook proper is combined with means for retaining or locking it in both its open and its closed position. My present improvement involves the same general plan, but is designed to furnish a more secure lock for the hook in its open position than is afforded by the special instrumentalities shown in said Letters Patent in illustration of the patented invention, my object being to positively lock the hook in its open position, which is a desideratum in the case of ladders designed for special uses—firemen's ladders, for instance—where it is essential to guard against the contingency of the hook being struck and closed by a blow or pressure from above, which may readily occur during the operation of raising a ladder. To this end I combine with the hook a spring-controlled bolt or pin, which, when the hook has been moved to its proper open position, automatically acts to lock it positively in that position. The hook, when once thus locked, is securely and firmly held in position until the pin is moved back against the stress of its controlling-spring far enough to be out of the path of the hook. I also make use of the same bolt or pin to secure the hook in its closed position; but inasmuch as it is not necessary to positively lock the hook in this position, I so arrange the parts that the pin or bolt will act in effect as a friction-pad with sufficient force to hold the hook in place, and yet at the same time to permit the latter to be moved to its open position without rendering it necessary to manipulate the bolt.

In the accompanying drawings, I have represented the preferred embodiment of my invention.

Figure 1 is a perspective view of the upper end of a ladder provided with my improved ladder-hooks in open position. Fig. 2 is a perspective view of one of the hooks with the hook proper in closed position. Fig. 3 is a section of the hook proper and base-plate on line 3 3, Fig. 2.

Like my patented hook, the hook shown in the drawings is composed of a base-plate, A, and a hook proper, B. The hook is held in place by a pivot-pin, $d^2$, which passes through the plate into and through the side piece, C, of the ladder, and is secured in place by a nut screwed upon its outer end, or by other suitable means, and the base-plate, which is fastened to the inner face of the side piece, C, by screws $a$, or other means, is provided with two stops, $d\ d'$, the former to meet the hook when open, as in Fig. 1, the latter to meet it when shut, as in Fig. 2.

The spring-controlled locking-pin, hereinbefore referred to, is shown at D. The means by which it is secured in place can be varied considerably; but I prefer the arrangement shown in the drawings, on the score of convenience, simplicity, and cheapness. On the rear of the base-plate is cast a cylindrical thimble, $e$, which is closed at the rear by a screw-plug, $e'$, and is of a diameter greater than the hole in the base-plate which opens into it. The pin or bolt D fits snugly, and is adapted to play back and forth in the hole in the base-plate, and is provided with an enlarged base, D', which fits and is adapted to play back and forth in the thimble $e$. Between the inner end or base, D', of the pin and the plug $e'$, which closes the thimble, is confined a spring, $f$, which tends to hold the pin normally projected, as seen in Fig. 1. In moving the hook to its open position, it passes over the pin, which is thus held depressed until the hook brings up against the stop $d$, at which time it passes and just clears the pin. The latter being released is at once projected by its spring to the position indicated in Fig. 1, in which position it securely locks and holds the hook, and the latter cannot be again closed until the pin is depressed by hand.

The hook shown in the drawings is so proportioned that it would in its open position still overlap slightly the pin were it not slightly recessed, as seen at $g$ on the edge which adjoins the pin. I find that I can also use the pin D as a means of holding the hook in its closed position. It is not necessary, however, for the hook in this position to be positively locked, and the parts are therefore arranged so that when the hook is thus placed the pin will act as a spring or friction-pad. To this end the hook is so formed that when it is closed it will still overlap slightly the pin. Its overlapping portion is beveled, as seen at $h$, and the top of the pin where it meets the hook is also beveled, as seen at $i$. Thus when the hook is in its closed position the two bevels $h\ i$ are in contact, and the pin, by reason of the stress of its spring, acts to hold the hook in that position. At the same time, however, the hook can by hand be pulled readily from such position to its open position, the pin yielding to permit such movement. This arrangement in practice is found extremely convenient for firemen's ladders and the like, for which this improvement has been more particularly designed.

My improved hook, in common with my patented hook, is arranged so that the hook proper, when folded up, will be within the compass of the ladder, and also, like it, it is reversible—that is to say, it is so made that it can be applied to either side piece, C, of the ladder at pleasure. To this end the stops $d\ d'$ are equidistant from the pivot on which the hook turns, the pin is equidistant from the stops, and the hook is the same on each face, and is provided on each face with a bevel, $h$.

I have described the best way known to me of carrying my invention into effect; but I do not wish to be understood as restricting myself to the precise construction and arrangement of parts I have described and shown in illustration of the invention.

The main feature of the invention is that the hook is positively locked or secured in place on the base-plate by a spring-controlled latch or lock; and this feature I believe to be novel with me irrespective of any special way of mounting the hook on the plate, whether by pivoting or otherwise.

What I claim as new is—

1. In a ladder-hook, the combination, with a base-plate and hook proper, of a spring-controlled catch or lock for positively locking the hook to the base-plate, substantially as hereinbefore set forth.

2. A ladder-hook comprising a base-plate, a spring-controlled locking pin or bolt mounted in said plate, and a pivoted hook, combined to operate substantially in the manner and for the purposes hereinbefore set forth.

3. The combination of the base-plate provided with stops, the pivoted hook arranged to bring up against one or the other of said stops when opened or closed, and the spring-controlled locking pin or bolt adapted to automatically lock the open hook, and to be overlapped by the beveled or equivalently-formed portion of the closed hook, substantially as and for the purposes hereinbefore set forth.

In testimony whereof I have hereunto set my hand this 27th day of March, 1884.

JOHN F. MANAHAN.

Witnesses:
CHARLES F. CONANT,
JAS. H. CARMICHAEL.